US009025532B2

(12) United States Patent
Schlipf

(10) Patent No.: US 9,025,532 B2
(45) Date of Patent: *May 5, 2015

(54) CELLPHONE WLAN ACCESS POINT

(71) Applicant: QUALCOMM Incorporated, San Diego, CA (US)

(72) Inventor: Carsten Schlipf, Boeblingen (DE)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,060

(22) Filed: May 27, 2014

(65) Prior Publication Data

US 2014/0357314 A1    Dec. 4, 2014

Related U.S. Application Data

(63) Continuation of application No. 12/996,752, filed as application No. PCT/US2008/066736 on Jun. 12, 2008, now Pat. No. 8,774,091.

(51) Int. Cl.
*H04W 4/00* (2009.01)
*H04J 3/16* (2006.01)
*H04W 88/10* (2009.01)
*H04W 88/04* (2009.01)
*H04W 88/00* (2009.01)
*H04W 88/06* (2009.01)

(52) U.S. Cl.
CPC ............ *H04W 88/10* (2013.01); *H04W 88/005* (2013.01); *H04W 88/04* (2013.01); *H04W 88/06* (2013.01)

(58) Field of Classification Search
USPC .................. 370/328, 338, 401, 466
See application file for complete search history.

(56) References Cited

U.S. PATENT DOCUMENTS

| 8,018,888 | B1 * | 9/2011 | Fuller et al. .................. 370/315 |
| 8,462,693 | B2 * | 6/2013 | Montemurro et al. ......... 370/328 |
| 8,780,857 | B2 * | 7/2014 | Balasubramanian et al. 370/331 |
| 2004/0258028 | A1 | 12/2004 | Hossain et al. |
| 2005/0153702 | A1 | 7/2005 | Cuffaro et al. |
| 2006/0217147 | A1 | 9/2006 | Olvera-Hernandez et al. |
| 2006/0245408 | A1 | 11/2006 | Lee et al. |
| 2006/0262739 | A1 | 11/2006 | Ramirez et al. |
| 2006/0271707 | A1 | 11/2006 | Cheline et al. |

(Continued)

FOREIGN PATENT DOCUMENTS

KR    10-2006-0089416    9/2006

OTHER PUBLICATIONS

International Search Report and Written Opinion—PCT/US2008/066736—ISA/EPO—Jan. 6, 2009.

(Continued)

*Primary Examiner* — Andrew Lee
(74) *Attorney, Agent, or Firm* — Donald C. Kordich

(57) ABSTRACT

An integrated cell phone/WLAN AP for providing cell phone functionality and cellular-based data connectivity to a WLAN enabled device. The cell phone AP comprises a WLAN radio, a WLAN AP coupled to the WLAN radio, a cellular radio coupled to the WLAN radio, for communicatively connecting to a cellular system having a cellular-based data service and passing data between the WLAN-enabled device and the cellular system, a cell phone function block coupled to the cellular radio for providing conventional cell phone functionality, and a power supply.

16 Claims, 3 Drawing Sheets

(56) References Cited

U.S. PATENT DOCUMENTS

| | | | |
|---|---|---|---|
| 2008/0019333 A1 | 1/2008 | Kharia et al. | |
| 2008/0107051 A1 | 5/2008 | Chen | |
| 2008/0123580 A1 | 5/2008 | Vathulya | |
| 2009/0213811 A1 | 8/2009 | Wang et al. | |
| 2009/0228240 A1 | 9/2009 | Makela et al. | |
| 2009/0257412 A1 | 10/2009 | Kuokkanen | |
| 2011/0080900 A1 | 4/2011 | Schlipf | |
| 2011/0116459 A1* | 5/2011 | Lee et al. | 370/329 |
| 2011/0222523 A1 | 9/2011 | Fu et al. | |
| 2012/0178441 A1 | 7/2012 | Shaheen et al. | |
| 2013/0029639 A1* | 1/2013 | Lee et al. | 455/411 |
| 2013/0242964 A1* | 9/2013 | Hassan et al. | 370/338 |
| 2014/0204834 A1* | 7/2014 | Singh et al. | 370/315 |

OTHER PUBLICATIONS

Cavalcanti, C. et al., "A New Routing Mechanism 1-15 for Integrating Cellular Networks, WLAN Hot Spots and MANETS," Personal Indoor and Mobile Radio Communications, PIMRC 2005, IEEE 16$^{th}$ International Symposium, vol. 2, Sep. 11-14, 2005, pp. 1414-1418 (See Abstract, Sections I-III).

* cited by examiner

CELLPHONE WLAN ACCESS POINT

CROSS-REFERENCE TO RELATED APPLICATION

This application is a continuation of U.S. patent application Ser. No. 12/996,752, filed Dec. 7, 2010 and entitled "Cellphone WLAN Access Point," which is a national stage entry of International Application No. PCT/US2008/066736, filed Jun. 12, 2008, the disclosures of which are incorporated herein by reference in their entirety

BACKGROUND

There are many devices that can wirelessly connect to the Internet via a wireless local area network (WLAN) access point (AP), commonly referred to as a WLAN "hot spot," a Wi-Fi network, or the like. Examples include many notebook computers, pocket PCs, personal digital assistants (PDAs), and many other devices, such as the Apple iPod Touch, the Nokia N810 Internet Tablet, and the HP iPAQ rx5900 Travel Companion. However, the coverage of WLAN hotspots is very limited, typically confined to places such as businesses, coffee shops, cafés, libraries, and the like.

Cellular communications technology is much more widely available than wireless hot spots. Wireless data services such as Internet access are generally available where cellular service is available via the cellular system. For example, so-called third generation (3G) cellular systems may include a data service called Universal Mobile Telecommunications System (UMTS). Precursors to 3G include the Global System for Mobile communications (GSM), currently the most commonly deployed cellular communications technology, which may include a General Packet Radio Service (GPRS) data service. Other cellular systems and data services have also been deployed and may be available depending on location.

A conventional cellular telephone (cell phone) can commonly be configured in conjunction with another device to act as a modem for that device, assuming that device can itself be configured to use the cell phone as a modem. However, many devices are WLAN enabled, but are not equipped and cannot be configured to be used with a modem. For example, an iPod Touch may be able to access the Internet via a Wi-Fi network. However, an iPod Touch as first introduced is not able to use a cellular data network. such as AT&T's 3G cellular data network, and cannot be configured to use a modem. So, for example, a user located in a cellular service area, but not near a wireless hot spot, might be able to use a regular cell phone to connect to the Internet using a cellular data service, but would not be able to use an iPod Touch to connect to the Internet at that location, and the iPod Touch cannot be configured to use the cell phone to access the Internet.

Furthermore, even if a device can be configured to use a cell phone as a modem, configuring the device and the cell phone to work together can be inconvenient, complicated, and confusing. For example, the device must use an operating system for which a device driver for the cell phone modem is available, and the user must ensure that the device driver is properly installed. In addition, the connection to the cell phone may be, for example, via a cable connection or via a Bluetooth wireless connection, and the user must ensure that the connection is properly configured.

In contrast, WLAN enabled devices are often pre-configured by the manufacturer or vendor, and can typically locate and connect with a WLAN with very little effort on the part of the user.

SUMMARY

An integrated cell phone/WLAN AP device for providing cell phone functionality and cellular-based data connectivity to a WLAN enabled device. The cell phone AP comprises a WLAN radio, an AP functions block coupled to the WLAN radio, a cellular radio coupled to the WLAN radio for communicatively connecting to a cellular system having a cellular-based data service and passing data between the WLAN enabled device and the cellular system, a cell phone functions block coupled to the cellular radio for providing conventional cell phone functionality, and a power supply.

It is to be understood that both the foregoing general description and the following detailed description are exemplary and explanatory and are intended to provide further explanation of the claims.

BRIEF DESCRIPTION OF THE DRAWINGS

The accompanying drawings, which are included to provide a further understanding of the disclosed device and are incorporated in and constitute a part of this specification, illustrate exemplary embodiments of the device and together with the description serve to explain the principles of the device.

In the drawings.

DETAILED DESCRIPTION

Reference will now be made in detail to various embodiments of the disclosed integrated cell phone WLAN AP device, examples of which are illustrated in the accompanying drawings.

An integrated cell phone wireless local area network (WLAN) access point (AP) (cell phone AP) is disclosed that is configurable to provide a cellular data service-based WLAN hot-spot to a WLAN enabled device, such as for providing Internet access. The cell phone AP can comprise a simple dynamic host configuration protocol (DHCP) server. The WLAN radio of the cell phone AP preferably has a limited effective wireless range, such as up to about three meters or less. In an embodiment, the cell phone AP can provide authentication and/or secure wireless communications mechanisms for the WLAN enabled device, such as wired equivalent privacy (WEP), Wi-Fi protected access (WPA), IEEE 802.11i compliant security, media access control (MAC) address filtering, and the like. Other capabilities can be provided as well, as will be described.

Figure 1A:
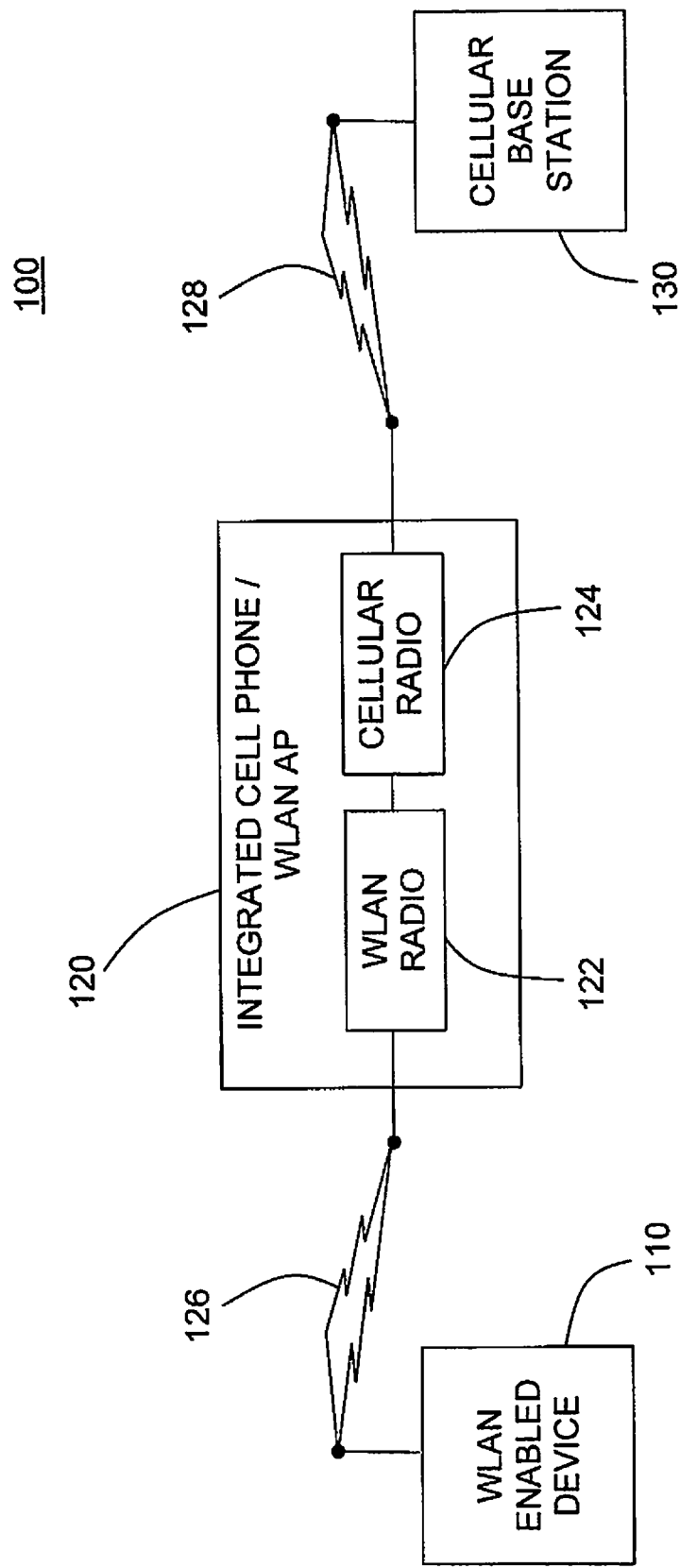
FIG. 1A is a block diagram of a system providing cellular data services to a WLAN enabled device using an integrated cell phone AP, as disclosed.

Referring now to FIG. 1A, shown is a wireless communication system 100 comprising a WLAN access-enabled (WLAN enabled) device 110, an integrated cell phone/WLAN access point (AP) (cell phone AP) 120, and a cellular base station 130. The cell phone AP 120 includes a WLAN radio 122, coupled to a cellular radio 124. The WLAN radio 122 of cell phone AP 120 is communicatively coupled to WLAN access device 110 via WLAN air interface 126, and the cellular radio 124 of cell phone AP 120 is communicatively coupled to cellular base station 130 via cellular air interface 128. The cellular base station 130 is part of a cellular system (not shown) that provides data services, such as Internet access, to the WLAN access device 110 via cell phone AP 120. Thus, to the cellular base station 130 the cell phone AP 120 appears as a cellular terminal that uses a cellular data service; whereas to the WLAN enabled device 110 the cell phone AP 120 appears as a conventional WLAN access point.

Figure 1B:
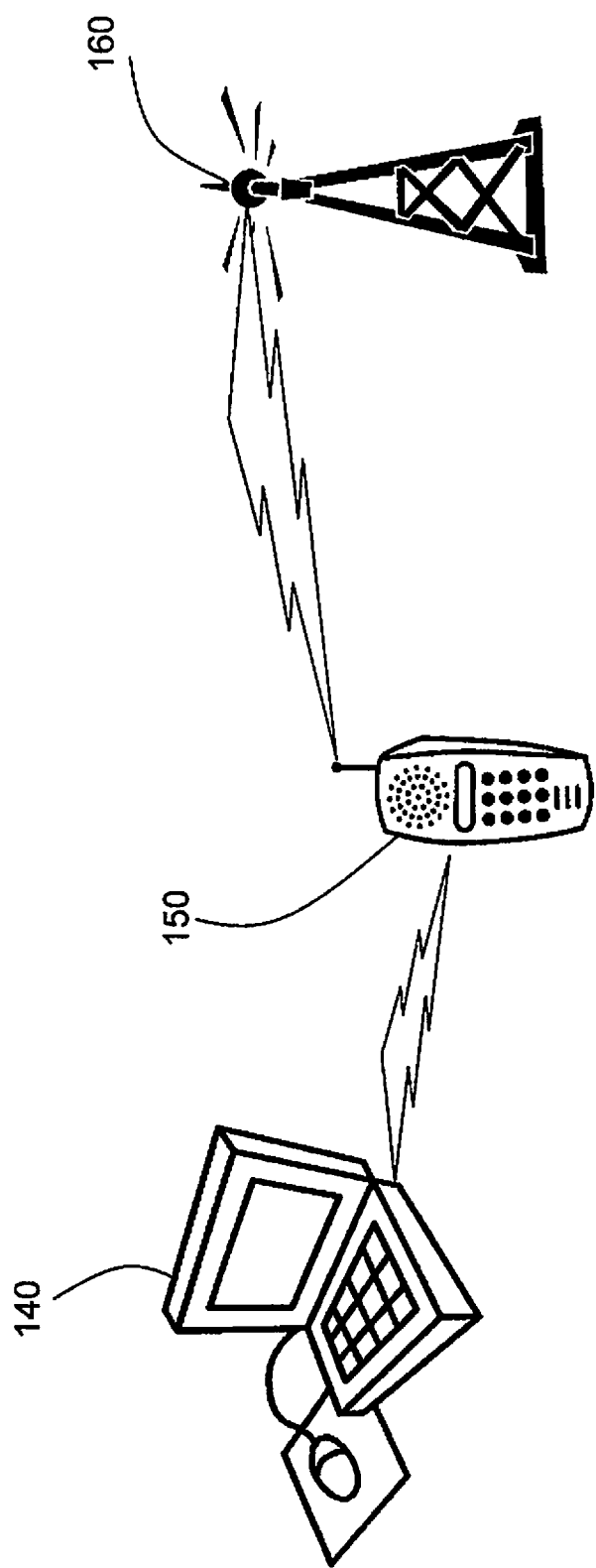
FIG. 1B is a diagram illustrating an embodiment of the system of FIG. 1A.

FIG. 1B shows an illustrative embodiment of the system of FIG. 1A, wherein the illustrated WLAN enabled device 110 is a laptop computer 140, the cell phone AP 120 is integrated with a conventional cell phone within the housing of the cell phone 150, and the cell phone AP 120 communicates with a 3G cellular base station 160.

As used herein the term wireless local area network (WLAN) is used to denote a wireless network operated using a protocol providing a limited service area, typically much less than one square kilometer, and commonly limited to only a few hundred square meters or less. The service area is served by one or more access points, each having a relatively short effective range, typically much less than one kilometer, and commonly limited to only about a few tens of meters to about one to two hundred meters. Typically, such networks do not provide for hand over functionality from one access point to another. Thus, a single access point provides, or a group of associated access points cooperate to provide, an area within which wireless service available, commonly called a "hot spot." Common examples of standardized WLAN protocols include IEEE 802.11, 802.11a, 802.11b, 802.11g, 802.11n and 802.11y standards, although it is contemplated that the claimed invention is applicable to other WLANs as well.

As used herein the term cellular system is used to denote a wireless access network having a very broad geographic service area, typically covering hundreds or thousands of contiguous square kilometers. The cellular service area is typically served by hundreds or thousands of wireless base stations, each having an effective unobstructed range of up to several kilometers or more. Cellular systems provide for handover of an ongoing wireless communication connection, such as a cellular telephone call, from one base station to another without dropping the connection. Thereby, a communication connection with a mobile device such as a cell phone can be maintained even while travelling anywhere within the large geographic service area. Typically, cellular systems can provide for both voice telephone communications and data communications.

There are many ways that different cellular technologies and communication protocols are commonly referred to. Cellular systems are sometimes referred to in terms of the organization or association that promulgates the specifications with which they are compliant, such as the so-called third generation partnership project (3GPP or 3GPP2). Cellular systems are sometimes referred to in terms of their "generation" of technological development (2G, 2.5G, 2.75G, 3G, 4G, or the like), or the channel access method used, such as time division multiple access (TDMA), or code division multiple access (CDMA). Cellular systems can be compliant with one or more of many different standards, be named for current or anticipated capabilities and/or be supported by marketing efforts or brands, and are sometimes referred to in terms of those standards, capabilities, or brands. Examples include global system for mobile communications (GSM), general packet radio service (GPRS), enhanced GPRS, enhanced data rates for GSM evolution (EDGE), universal mobile telecommunications system (UMTS), high speed packet access (HSPA), high speed downlink packet access (HSDPA), high speed uplink packet access (HSUPA), high speed orthogonal frequency division multiplexing (OFDM) packet access (HSOPA), long term evolution (LTE), wireless broadband (WiBro), Xohm, worldwide interoperability for microwave access (WiMAX), and IEEE 802.16. Other names, brands, specifications, standards, and the like also exist, and new ones are introduced frequently. As used herein, the term cellular base station is used to denote the equipment that provides the wireless (air) interface to the cellular system, such as a base station, Node-B, site controller, or other interfacing equipment in a cellular communications environment. In general, all such technologies are contemplated to be within the scope of the appended claims provided they have the cellular system characteristics described previously.

Figure 2:
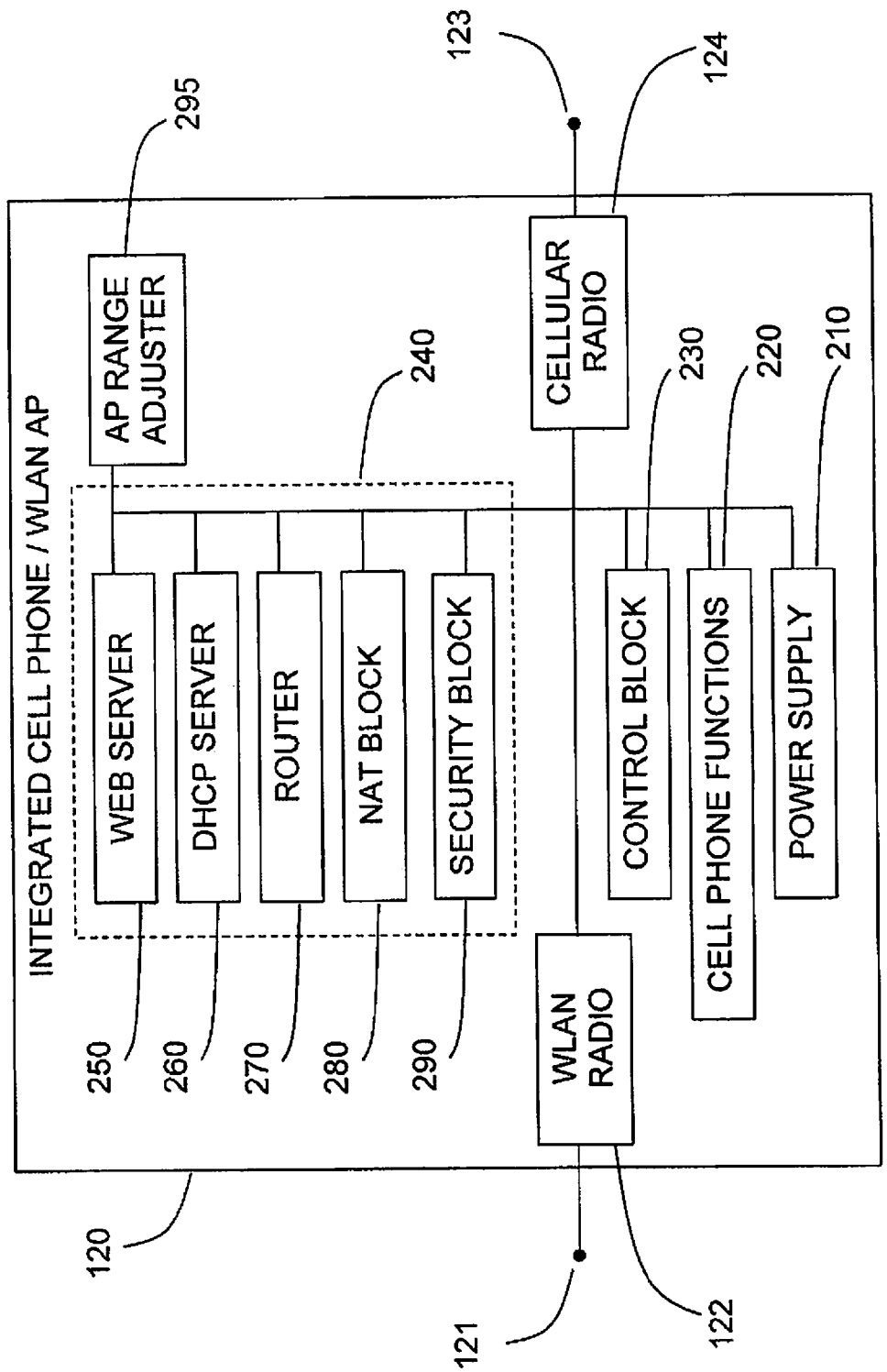
FIG. 2 is a block diagram of an embodiment of the disclosed integrated cell phone AP.

Referring now to FIG. 2, shown is a block diagram of an exemplary implementation of a cell phone AP 120. The paths indicated between elements of cell phone AP 120 represent logical communication paths between the elements, and not necessarily the physical path between those elements. The elements can be coupled in any way that provides the logical communication paths indicated.

Included in cell phone AP 120 are WLAN radio 122 and cellular radio 124. WLAN radio 122 represents any combination of hardware and/or program instructions capable of supplying a wireless communication interface between cell phone AP 120 and WLAN enabled device 110 shown in FIG. 1A. For example, WLAN radio 122 may include a transceiver operable to exchange data communications via antenna 121 with one or more WLAN enabled devices 110, using a WLAN communications protocol as described previously. Cellular radio 124 represents any combination of hardware and/or program instructions capable of supplying a wireless communications interface between cell phone AP 120 and cellular base station 130 of FIG. 1. For example, cellular radio 124 may include a transceiver operable to exchange data communications with cellular base station via antenna 123, using a cellular communications protocol as described previously. In an embodiment, antennas 121 and 123 can represent a single antenna shared by WLAN radio 122 and cellular radio 124.

Cell phone AP 120 also includes power supply 210. In an exemplary embodiment, power supply 210 can include a battery, such as a rechargeable battery. Power supply 210 can also or alternatively include a transformer coupled to a source of alternating current (AC) such as via a power cord to an AC outlet, capable of converting the alternating current into a form usable by cell phone AP 120. In another embodiment, a wired interface, such as a wired USB interface, can be used to provide power to the cell phone AP 120, and/or to charge a rechargeable battery. In yet another embodiment, power supply 210 can include one or more other devices providing electrical energy, such as a fuel cell.

Cell phone AP 120 includes cell phone functions block 220, which generally represents conventional cell phone functionality, and AP functions block 240, which generally represents conventional WLAN AP functionality. Cell phone functions block 220 can represent, for example, any combination of hardware and/or program instructions capable of providing the ability to make or receive voice telephone calls, multi-party voice calls, and the like. Cell phone functions block 220 can also include the ability to send or received text messages, instant messages, and the like. Cell phone functions block 220 can also include the ability to connect to a separate headset, such as a wired headset, or a wireless Bluetooth enabled headset, or the like.

In an embodiment, the cell phone functions block 220 can be disabled, selectively or by default, when the AP functions block 240 is in use. In this embodiment, control block 230 can make the cell phone functions block 220 or the AP functions block 240 unavailable for use when the other is in use. That is, only one of the cell phone functionality and the AP functionality can be used at a time. In another embodiment, cell phone AP 120 can be used simultaneously both as a cell phone and as a WLAN AP. In this embodiment, control block 230 can coordinate the AP functions with the cell phone functions. For example, WLAN enabled device 110 can use the AP functions in conjunction with the cellular radio 124 to access cellular data services, and at the same time the user can use the cell phone AP to make or receive a telephone call, and control block 230 can manage the use of the cellular radio 124 by sharing the cellular radio 124 between them, such as by coordinating the AP function and cell phone functions and multiplexing their communications, or interrupting one while the other is active. In an embodiment, preference for the cell phone functionality over the AP functionality, or vice versa, can be set by default, or can be selected by the user. In yet another embodiment, the cellular radio 124 can be used simultaneously, without interruption, both to provide cellular data services via the WLAN radio 122, and simultaneously to provide conventional cell phone functionality such as voice calls by cell phone functions block 220. In yet another embodiment, cell phone functions block 220 can be provided with its own separate cellular radio (not shown) that is not shared with the cellular radio 124 used by the WLAN enabled device to access cellular data service.

AP functions block 240, illustrated in FIG. 2 by the dotted line encompassing functional blocks as will be described, represents generally any combination of hardware and/or program instructions for providing WLAN communications to one or more WLAN enabled devices 110. In an embodiment, AP functions block 240 can provide conventional WLAN hub or switch functionality to a plurality of WLAN enabled devices 110. That is, AP functions block 240 can provide WLAN connectivity for a plurality of WLAN enabled devices 110, whether or not any of the devices are accessing or attempting to access cellular data service via cellular radio 124. In that embodiment, the AP functionality and the cell phone functionality can be substantially non-interfering and can thus be used simultaneously, even without control block 230. However, as described previously. other embodiments provide for access to cellular data services by one or more WLAN enabled devices 110 while also using the cell phone functions of cell phone AP 120.

AP functions block 240 can include, for example, web server 250, which represents generally any combination of hardware and/or program instructions capable of serving web pages to a WLAN access device 110, such as a laptop computer 140. Such web pages may provide a user with an interface to select or specify settings related to the operation of the cell phone AP 120, such as passwords and other security settings, interne protocol (IP) addresses, and the like. Alternatively or in addition, the cell phone AP 120 may provide its own independent interface for a user to enter such settings directly into the cell phone AP 120, for example, using a built-in or attached display and keypad.

AP functions block 240 can also include dynamic host control protocol (DHCP) server 260, which represents generally any combination of hardware and/or program instructions capable of obtaining various parameters necessary for the WLAN enabled device 110 to operate in an internet protocol (IP) network environment, and assigning an IP address and other IP parameters needed to the WLAN enabled device 110 so that WLAN enabled device 110 can communicate, for example, with the cellular data system, and/or with other WLAN access devices 110 via the cell phone AP 120.

AP functions block 240 can also include router 270, which represents generally any combination of hardware and/or program instructions capable of directing communications between a WLAN enabled device 110 and the cellular data system and/or other WLAN access devices 110 via the cell phone AP 120.

AP functions block 240 can also include network address translation (NAT) block 280, which represents generally any combination of hardware and/or program instructions capable of redirecting communications through the router 270 by re-writing the source and/or destination IP addresses of data packets of the communications.

AP functions block 240 can also include security block 290, which represents generally any combination of hardware and/or program instructions capable of securing the cell phone AP against unauthorized use. For example, security block 290 can require that a password be entered by a WLAN enabled device 110 attempting to connect to the WLAN, such as into a field of a web page served by web server 250, to authenticate the WLAN enabled device. Other known mechanisms can also be included to protect access to the WLAN and/or to communications of the WLAN. For example, encryption methods can be provided to encrypt either or both of the WLAN communications or the cellular data communications, such as wired equivalent privacy (WEP) or Wi-Fi protected access (WPA), and/or media access control (MAC) address filtering can be provided.

AP functions block 240 can also include AP range adjuster 295, which represents generally any combination of hardware and/or program instructions capable of selectively or automatically limiting or adjusting the effective range of WLAN radio 122, such as by adjusting the power delivered to WLAN radio 122. For example, a user can select a limited effective range setting to be used when power is provided by a battery and not by an AC outlet or USB port, and/or the cell phone AP can detect that battery power is being used and default to a limited effective range setting, in order to preserve battery life. In another example, a user can select a greater effective range setting to be used when power is provided by an AC outlet or USB port and not by a batter, in order to provide better connectivity to a plurality of WLAN enabled devices 110, and/or the cell phone AP can detect that power is provided by an AC outlet or USB port and default to an increased range setting in order to provide the improved connectivity.

Thus, as described, the disclosed cell phone AP 120 is able to function as a limited range WLAN AP that can provide Internet access for a WLAN enabled device 110 over a cellular communications service area, a much larger area than is served by WLAN hot spots. In addition, the user is able to connect to the Internet with very little configuration effort, because the cell phone AP is not acting as a modem, so there is no need to set it up as a modem for the WLAN enabled device 110. Thus, the user is able to connect laptops, personal digital assistants (PDAs}, and other WLAN enabled devices without regard to the availability of a modem device driver for the WLAN enabled device 110 to use with the user's cell phone, as was needed in the prior art.

Various modifications and variations can be made to the disclosed system without departing from the spirit or scope of the invention. Thus, it is intended that the appended claims cover the modifications and variations of the disclosed system provided they come within the scope of the claims and their equivalents.

What is claimed is:

1. A method for providing both cell phone functionality and WLAN access point functionality by a cell phone, the method comprising:
communicatively connecting a WLAN radio of the cell phone to a separate WLAN-enabled device, wherein the WLAN radio is coupled to an access point (AP) functions block to provide WLAN functions of the cell phone;

communicatively connecting a cellular radio of the cell phone to a cellular system having a cellular-based data service, wherein the cellular radio is coupled to the WLAN radio; and passing data between the separate WLAN-enabled device and the cellular system, under control of the AP functions block, through the WLAN radio and the cellular radio of the cell phone and using the cellular-based data service such that the cell phone functions as a WLAN access point for the separate WLAN-enabled device.

2. The method of claim 1, wherein the WLAN radio is compatible with at least one WLAN standard selected from the group consisting of IEEE 802.11, 802.11a, 802.11b, 802.11g, 802.11n, and 802.11y.

3. The method of claim 1, wherein the cellular radio is compatible with at least one cellular-based data service technology selected from the group consisting of 3GPP, 3GPP2, 2G, 2.5G, 2.75G, 3G, 4G, GSM, GPRS, enhanced GPRS, Enhanced Data rates for GSM Evolution (EDGE), UMTS, HSPA, HSDPA, HSUPA, HSOPA, Long Term Evolution (LTE), WiBro, Xohm, WiMax, and IEEE 802.16.

4. The method of claim 1, further comprising at least one of
authenticating the connection of the WLAN radio to the separate WLAN enabled device,
encrypting WLAN communication; and
encrypting cellular data communication.

5. The method of claim 4, wherein the at least one of authenticating the connection, encrypting WLAN communication, and encrypting cellular data communication is performed using wired equivalent privacy (WEP), Wi-Fi protected access (WPA), IEEE 802.11i compliant security, or media access control (MAC) address filtering.

6. The method of claim 1, further comprising:
providing power to the WLAN radio; and
varying a range of the WLAN radio, wherein the range of the WLAN radio when power to the cell phone is provided by a battery is less than the range of the WLAN radio when power to the cell phone is provided by an AC outlet or USB port.

7. The method of claim 1, further comprising:
assigning an internet protocol (IP) address for the WLAN enabled device.

8. The method of claim 1, further comprising:
providing network address translation (NAT) whereby simultaneous Internet connectivity for a plurality of WLAN enabled devices is provided by the cell phone.

9. A cell phone access point (cell phone AP) for providing both cell phone functionality and WLAN access point functionality to a cell phone, the cell phone AP comprising:
means for communicatively connecting a WLAN radio of the cell phone to a separate WLAN-enabled device, wherein the WLAN radio is coupled to an access point (AP) functions block to provide WLAN functions of the cell phone;

means for communicatively connecting a cellular radio of the cell phone to a cellular system having a cellular-based data service, wherein the cellular radio is coupled to the WLAN radio; and means for passing data between the separate WLAN-enabled device and the cellular system, under control of the AP functions block, through the WLAN radio and the cellular radio of the cell phone and using the cellular-based data service such that the cell phone functions as a WLAN access point for the separate WLAN-enabled device.

10. The cell phone AP of claim 9, wherein the WLAN radio is compatible with at least one WLAN standard selected from the group consisting of IEEE 802.11, 802.11a, 802.11b, 802.11g, 802.11n, and 802.11y.

11. The cell phone AP of claim 9, wherein the cellular radio is compatible with at least one cellular-based data service technology selected from the group consisting of 3GPP, 3GPP2, 2G, 2.5G, 2.75G, 3G, 4G, GSM, GPRS, enhanced GPRS, Enhanced Data rates for GSM Evolution (EDGE), UMTS, HSPA, HSDPA, HSUPA, HSOPA, Long Term Evolution (LTE), WiBro, Xohm, WiMax, and IEEE 802.16.

12. The cell phone AP of claim 9, further comprising at least one of:
means for authenticating the connection of the WLAN radio to the separate WLAN enabled device,
means for encrypting WLAN communication; and
means for encrypting cellular data communication.

13. The cell phone AP of claim 12, wherein the at least one of means for authenticating the connection, means for encrypting WLAN communication, and means for encrypting cellular data communication include wired equivalent privacy (WEP), Wi-Fi protected access (WPA), IEEE 802.11i compliant security, or media access control (MAC) address filtering.

14. The cell phone AP of claim 9, further comprising:
means for providing power to the WLAN radio; and
means for varying a range of the WLAN radio, wherein the range of the WLAN radio when power to the cell phone is provided by a battery is less than the range of the WLAN radio when power to the cell phone is provided by an AC outlet or USB port.

15. The cell phone AP of claim 9, further comprising:
means for assigning an interne protocol (IP) address for the WLAN enabled device.

16. The cell phone AP of claim 9, further comprising:
means for providing network address translation (NAT) whereby simultaneous Internet connectivity for a plurality of WLAN enabled devices is provided by the cell phone.

* * * * *